US006287527B1

(12) United States Patent
Kawanami et al.

(10) Patent No.: US 6,287,527 B1
(45) Date of Patent: Sep. 11, 2001

(54) METHOD FOR CONTROLLING EXHAUST EMISSION

(75) Inventors: Makoto Kawanami; Makoto Horiuchi, both of Himeji (JP)

(73) Assignees: ICT Co., Ltd., Osaka (JP); International Catalyst Technology, Inc., NJ (US)

( * ) Notice: Subject to any disclaimer, the term of this patent is extended or adjusted under 35 U.S.C. 154(b) by 0 days.

(21) Appl. No.: 09/125,309

(22) PCT Filed: Dec. 26, 1996

(86) PCT No.: PCT/JP96/03798

§ 371 Date: Oct. 14, 1998

§ 102(e) Date: Oct. 14, 1998

(87) PCT Pub. No.: WO98/29188

PCT Pub. Date: Jul. 9, 1998

(51) Int. Cl.$^7$ ........................................ B01J 8/02
(52) U.S. Cl. ................... 423/213.2; 423/239.1; 502/302; 502/345; 502/346; 502/355
(58) Field of Search ..................... 502/302, 345, 502/346, 355; 423/239.1, 213.2

(56) References Cited

U.S. PATENT DOCUMENTS

| | | |
|---|---|---|
| 3,226,340 | 12/1965 | Stephens et al. . |
| 3,835,032 * | 9/1974 | Dolbear et al. ................... 208/120 |
| 4,228,036 * | 10/1980 | Swift et al. ....................... 252/437 |
| 4,959,348 * | 9/1990 | Higashibata et al. .................. 505/1 |
| 5,130,109 * | 7/1992 | Wan ................................ 423/213.2 |

FOREIGN PATENT DOCUMENTS

| | | |
|---|---|---|
| 0101111A1 | 2/1984 | (EP) . |
| 2261810 | 9/1975 | (FR) . |
| 48 092289A | 11/1973 | (JP) . |
| A 48-92289 | 11/1973 | (JP) . |
| 51 014890A | 2/1976 | (JP) . |
| A 51-14890 | 2/1976 | (JP) . |
| 63 100919A | 5/1988 | (JP) . |
| A 63-100919 | 5/1988 | (JP) . |
| 4 219147 | 8/1992 | (JP) . |
| A 4-219147 | 8/1992 | (JP) . |
| 5 137963A | 6/1993 | (JP) . |
| A 5-137963 | 6/1993 | (JP) . |
| 6 182201 | 7/1994 | (JP) . |
| A 6-182201 | 7/1994 | (JP) . |
| 7 213900A | 8/1995 | (JP) . |
| A 7-213900 | 8/1995 | (JP) . |

* cited by examiner

Primary Examiner—Tom Dunn
(74) Attorney, Agent, or Firm—Birch, Stewart, Kolasch & Birch, LLP

(57) ABSTRACT

Exhaust emission control catalysts capable of efficiently removing nitrogen oxide in exhaust containing a large amount of oxygen emitted from a diesel engine and the like and reducing the generation of particulate matter in the exhaust under high temperature conditions, and a method for controlling the emission of exhaust using the exhaust emission control catalysts. The exhaust emission control catalysts contain copper, praseodymium, and yttrium. The method for controlling the emission of exhaust purifies exhaust containing hydrocarbon and nitrogen oxide in a mole ratio (hydrocarbon/nitrogen oxide) within a range of 0.5 to 30 by bringing the exhaust into contact with the exhaust emission control catalysts. It is possible to efficiently remove nitrogen oxide in the exhaust by reduction while suppressing the oxidation of sulfur dioxide in the exhaust.

16 Claims, No Drawings

METHOD FOR CONTROLLING EXHAUST EMISSION

This application is the national phase under 35 U.S.C. §371 of prior PCT International Application No. PCT/JP96/03798 which has an International filing date of Dec. 26, 1996 which designated the United States of America, the entire contents of which are hereby incorporated by reference.

TECHNICAL FIELD

The present invention relates to catalysts and a method for controlling (purifying) the emission of exhaust from an internal combustion engine. The present invention relates more particularly to catalysts and a method for controlling the emission of exhaust, capable of reducing injurious (noxious) components, particularly $NO_x$ (nitrogen oxide), contained in the exhaust by decomposition and of removing particulate matter, unburned hydrocarbon, and carbon monoxide by combustion.

BACKGROUND ART $NO_x$ in the atmosphere is the cause of photochemical smog and acid rain. Hence, the discharge of $NO_x$ from moving sources like automobiles incorporating internal combustion engines, such as gasoline engine and diesel engine, poses a social problem. The internal combustion engine is one of the $NO_x$ sources. Therefore, there is a tendency towards tightening up the laws and regulations concerning the amount of discharge of $NO_x$. Accordingly, the development of exhaust emission control catalysts is being actively carried out.

As a conventional exhaust emission control catalyst for controlling the emission of exhaust from the gasoline engine, a so-called three-way catalyst capable of simultaneously reducing $NO_x$, unburned hydrocarbon, and carbon monoxide is known. Since the exhaust from a typical gasoline engine contains very little oxygen, it is possible to achieve efficient reduction of $NO_x$ by unburned hydrocarbon or carbon monoxide, and decrease $NO_x$.

However, the exhaust from the diesel engine contains excessive oxygen because of its engine characteristics. Moreover, stoichiometrically, the exhaust from the diesel engine contains less hydrocarbon and carbon monoxide which function as a reducing agent compared to $NO_x$. Therefore, when a conventional three-way catalyst is used for the treatment of the exhaust from the diesel engine, $NO_x$ can hardly be decreased.

Furthermore, since the exhaust from the diesel engine contains a large amount of particulate matter formed by carbons, soluble organic fractions (SOF), sulfate, etc., the amounts of these elements discharged are restricted by the laws and regulations. Therefore, when using a typical three-way catalyst for the treatment of the exhaust from the diesel engine, it is also required to reduce the particulate matter. However, such a catalyst can hardly decrease the particulate matter.

In resent years, a lean burn gasoline engine, and a cylinder injection of fuel type gasoline engine have been developed for the purpose of decreasing the fuel consumption. Since these engines cause lean burn, the oxygen concentration in the exhaust from these engines is high. Therefore, when a typical three-way catalyst is used for the treatment of the exhaust from such gasoline engines, it is difficult to decrease $NO_x$.

In order to solve this problem, a catalyst containing a porous carrier like zeolite carrying copper is proposed as an exhaust emission control catalyst which effectively removes $NO_x$ in exhaust containing a large amount of oxygen, such as exhaust from the diesel engine and exhaust from the lean burn gasoline engine. An example of such a catalyst is disclosed in Japanese Publication for Unexamined Patent Application No. 100919/1988 (Tokukaisho 63-100919). However, this catalyst is inferior in heat resistance, and its $NO_x$ removing ability tends to be lowered by sulfur oxides like $SO_2$ contained in the exhaust. Namely, there is a problem that the catalyst is readily poisoned.

Moreover, Japanese Publication for Unexamined Patent Application No. 137963/1993 (Tokukaihei 5-137963) discloses an exhaust emission control catalyst containing platinum as a principal component. However, since this catalyst is highly active to oxidize $SO_2$ in the exhaust, a large amount of sulfates are produced by the oxidation of $SO_2$, resulting in an increase in the content of sulfates in the exhaust. Thus, there is a problem that this catalyst increases the amount of particulate matter in the exhaust due to the sulfates. In particular, in the case of the exhaust from a diesel engine which contains a larger amount of particulate matter compared to a gasoline engine, it is required to reduce the discharge of the particulate matter to a lower level. Hence, there is a more serious problem with respect to the exhaust from the diesel engine, namely an increased amount of particulate matter is produced.

Furthermore, Japanese Publication for Unexamined Patent Application No. 219147/1992 (Tokukaihei 4-219147) discloses an exhaust emission control catalyst containing a particular zeolite which carries cobalt, copper and/or rhodium, and rare earth metal as essential components.

However, only an exhaust emission control catalyst using lanthanum or cerium as the rare earth metal is disclosed as an example in this publication. When lanthanum or cerium is used as the rare earth metal, the activity of oxidizing $SO_2$ in the exhaust becomes higher. Therefore, when this catalyst is used for the treatment of high temperature exhaust from a diesel engine, a large amount of sulfates are produced by the oxidation of $SO_2$, resulting in an increase in the content of the sulfates in the exhaust. Thus, like the above-mentioned catalyst, this catalyst causes a problem that the amount of particulate matter in the exhaust is increased.

Considering the above-mentioned conventional problems, it is an object of the present invention to provide exhaust emission control catalysts and a method for controlling the emission of exhaust, which can efficiently decrease $NO_x$ in exhaust containing a large amount of oxygen like exhaust from a diesel engine, and reduce the amount of particulate matter in the exhaust under high temperature conditions.

DISCLOSURE OF THE INVENTION

In order to achieve the above-mentioned object, the present inventors eagerly studied exhaust emission control catalysts, and found that an exhaust emission control catalyst having a catalytic component containing copper, praseodymium, and yttrium has an excellent ability that is not seen in the conventional exhaust emission control catalysts. The inventors completed the present invention based on the results of the study.

Namely, in order to solve the above-mentioned problems, exhaust emission control catalysts of the present invention are characterized in having the catalytic component containing copper, praseodymium, and yttrium.

Moreover, in the exhaust emission control catalysts of the present invention, at least one kind of element selected from the group consisting of cobalt, iron, nickel, lanthanum, cerium, and neodymium is preferably added to the catalytic component.

Furthermore, a preferred weight ratio of copper, praseodymium, and yttrium in terms of their oxides is that praseodymium oxide is 0.2 to 20 weight parts and yttrium oxide is 0.2 to 20 weight parts based on 1 weight part of copper oxide.

Additionally, in the exhaust emission control catalysts of the present invention, it is preferred that the catalytic component is carried in inorganic oxide which is formed from at least one of zirconia and zeolite.

In this structure, the exhaust emission control catalyst can efficiently reduce and decompose $NO_x$ in the exhaust containing a large amount of oxygen. Moreover, the exhaust emission control catalyst not only burns injurious components contained in the exhaust, such as unburned hydrocarbon and carbon monoxide, but also burns SOF as particulate matter. Furthermore, since the exhaust emission control catalyst can suppress the oxidative reaction of $SO_2$ in the exhaust, it is possible to reduce the amount of particulate matter produced from sulfate by the oxidation of $SO_2$.

Consequently, such an exhaust emission control catalyst can efficiently remove $NO_x$ in the exhaust containing a large amount of oxygen, and reduce the amount of particulate matter in the exhaust under high temperature conditions.

In order to solve the above-mentioned problems, a method for controlling the emission of exhaust according to the present invention is characterized by bringing exhaust containing hydrocarbon and nitrogen oxide in a mole ratio (hydrocarbon/nitrogen oxide) of 0.5 to 30, and more preferably 1 to 20, into contact with the exhaust emission control catalyst. Moreover, it is preferred for the method of controlling the emission of exhaust of the present invention that the exhaust is emitted from a diesel engine.

With this method, it is possible to efficiently remove $NO_x$ in exhaust, particularly $NO_x$ in exhaust from a diesel engine, and suppress the oxidation of $SO_2$ in the exhaust, thereby decreasing the amount of particulate matter in the exhaust under high temperature conditions as described above.

The following description will explain the present invention in detail.

The exhaust emission control catalysts of the present invention have a catalytic component containing at least copper, praseodymium, and yttrium.

With regard to the weight ratio of copper and praseodymium contained in the exhaust emission control catalysts, when the ratio is calculated in terms of their oxides, the amount of praseodymium oxide is preferably 0.2 to 20 weight parts, and more preferably 0.5 to 10 weight parts based on 1 weight part of copper oxide.

If the weight ratio of praseodymium to copper in terms of their oxides is such that praseodymium oxide is less than 0.2 weight parts based on 1 weight part of copper oxide, the effect of suppressing the oxidation activity of $SO_2$ is reduced. Thus, such a ratio is not preferred. On the other hand, if the weight ratio of praseodymium to copper in terms of their oxides is such that praseodymium oxide is more than 20 weight parts based on 1 weight part of copper oxide, the effect of suppressing the oxidation activity of $SO_2$ corresponding to the increase in the amount of praseodymium is not exhibited any longer, resulting in an economical disadvantage and a lowering of the $NO_x$ decomposition activity. Hence, such a ratio is not preferred.

With regard to the weight ratio of copper and yttrium contained in the exhaust emission control catalysts, when the ratio is calculated in terms of their oxides, the amount of yttrium oxide is preferably 0.2 to 20 weight parts, and more preferably 0.5 to 10 weight parts based on 1 weight part of copper oxide.

If the weight ratio of yttrium to copper in terms of their oxides is such that yttrium oxide is less than 0.2 weight parts based on 1 weight part of copper oxide, the $NO_x$ decomposition activity is lowered. Thus, such a ratio is not preferred. On the other hand, if the weight ratio of yttrium to copper in terms of their oxides is such that yttrium oxide is more than 20 weight parts based on 1 weight part of copper oxide, an improvement of the $NO_x$ decomposition activity corresponding to the increase in the amount of yttrium is not exhibited any longer, resulting in an economical disadvantage and an increase in the $SO_2$ oxidation activity. Consequently, sulfates are generated by the oxidation of $SO_2$, and the amount of particulate matter in the exhaust is increased. Thus, such a ratio is not preferred.

Namely, the weight ratio of copper, praseodymium, and yttrium in the exhaust emission control catalysts in terms of their oxides is preferably arranged such that the amount of praseodymium oxide is 0.2 to 20 weight parts and the amount of yttrium oxide is 0.2 to 20 weight parts based on 1 weight part of copper oxide. With this arrangement, the $NO_x$ decomposition activity is more efficiently improved, and the $SO_2$ oxidation activity is more efficiently suppressed.

The catalytic component of the exhaust emission control catalysts contains copper, praseodymium, and yttrium. It is more preferred that the catalytic component further contains at least one kind of element (hereinafter referred to as other metal) selected from the group consisting of iron, cobalt, nickel, yttrium, lanthanum, cerium, and neodymium. Namely, it is preferred to add other metal to the catalytic component. By adding other metal to the catalytic component, it is possible to improve the efficiency of improving the $NO_x$ decomposition activity and suppressing the $SO_2$ oxidation activity.

The other metal may be one kind or a combination of more than one kinds of the above-mentioned elements. Examples of the other metal include iron, cobalt, nickel, lanthanum, cerium, neodymium, lanthanum-iron, lanthanum-cobalt, lanthanum-nickel, cerium-iron, cerium-cobalt, cerium-nickel, neodymium-iron, neodymium-cobalt, and neodymium-nickel. Among these metals, it is particularly preferred to use iron, cobalt, nickel, and a combination thereof as the other metal. By adding such a metal, the exhaust emission control catalysts of the present invention can more efficiently improve the $NO_x$ decomposition activity and suppress the $SO_2$ oxidation activity.

The exhaust emission control catalysts usually contain a refractory (fire-resistant) inorganic oxide in addition to the above-mentioned catalytic component. It is preferred that the catalytic component is carried in the refractory inorganic oxide. Namely, it is preferred that the catalytic component is dispersed in the refractory inorganic oxide. It is more preferred that the exhaust emission control catalysts contain a refractory carrier (substrate) for carrying the catalytic component together with the refractory inorganic oxide. Namely, it is preferred that the catalytic component is carried by the refractory carrier in such a state that the catalytic component is dispersed in the refractory inorganic oxide. In such a structure, it is possible to efficiently bring the exhaust into contact with the catalytic component.

Examples of a copper compound used for causing the refractory carrier to carry copper include: inorganic salts of copper, such as copper nitrate, copper sulfate, copper phosphate, copper carbonate, copper chloride, copper bromide, and copper iodide; organic salts of copper such as copper acetate, and copper citrate; and copper oxide. The use of copper nitrate, copper sulfate, copper chloride and copper acetate is particularly suitable.

With regard to the amount of copper to be carried on the refractory carrier, copper is preferably in the range of 1 to 20 grams in terms of copper oxide, and more preferably in the range of 1 to 10 grams, based on 1 litter of the refractory carrier.

When the amount of copper is less than 1 gram, the $NO_x$ decomposition activity is lowered. Thus, such an amount is not preferred. On the other hand, when the amount of copper is more than 20 grams, an improvement of the $NO_x$ decomposition activity corresponding to the increase in the amount of copper is not exhibited any longer, resulting in an economical disadvantage. Moreover, when the amount of copper is more than 20 grams, the $SO_2$ oxidation activity is enhanced, and the amount of particulate matter in the exhaust is increased due to the generation of sulfates by the oxidation of $SO_2$. Thus, such an amount is not preferred.

Examples of a praseodymium compound used for causing the refractory carrier to carry praseodymium include: inorganic salts of praseodymium, such as praseodymium nitrate, and praseodymium fluoride; organic salts of praseodymium, such as praseodymium acetate, and praseodymium oxalate; and praseodymium oxide. The use of praseodymium nitrate, praseodymium fluoride, and praseodymium acetate is particularly suitable.

With regard to the amount of praseodymium to be carried in the refractory carrier, praseodymium is preferably in the range of 1 to 20 grams in terms of praseodymium oxide, and more preferably in the range of 1 to 10 grams, based on 1 litter of the refractory carrier.

When the amount of praseodymium is less than 1 gram, the effect of suppressing the $SO_2$ oxidation activity is lowered. Thus, such an amount is not preferred. On the other hand, when the amount of praseodymium is more than 20 grams, an improvement of the effect of suppressing the $SO_2$ oxidation activity corresponding to the increase in the amount of praseodymium is not exhibited any longer, resulting in an economical disadvantage. Moreover, when the amount of praseodymium is more than 20 grams, the $NO_x$ decomposition activity is lowered. Thus, such an amount is not preferred.

Examples of a yttrium compound used for causing the refractory carrier to carry yttrium include: inorganic salts, such as yttrium nitrate, yttrium carbonate, yttrium chloride, and yttrium fluoride; organic salts, such as yttrium acetate, and yttrium oxalate; and yttrium oxide. The use of yttrium nitrate, yttrium fluoride, yttrium acetate, and yttrium carbonate is particularly suitable.

With regard to the amount of yttrium to be carried on the refractory carrier, yttrium is preferably in the range of 1 to 20 grams in terms of yttrium oxide, and more preferably in the range of 1 to 10 grams, based on 1 litter of the refractory carrier.

When the amount of yttrium is less than 1 gram, the $NO_x$ decomposition activity is lowered. Thus, such an amount is not preferred. On the other hand, when the amount of yttrium is more than 20 grams, an improvement of the $NO_x$ decomposition activity corresponding to the increase in the amount of yttrium is not exhibited any longer, resulting in an economical disadvantage. Moreover, when the amount of yttrium is more than 20 grams, the $SO_2$ oxidation activity is enhanced, and the amount of particulate matter in the exhaust is increased due to the generation of sulfates by the oxidation of $SO_2$. Thus, such an amount is not preferred.

Examples of a metal compound used for causing the refractory carrier to carry the other metal (hereinafter referred to as other metal compound) include: inorganic salts, such as nitrate, sulfate, phosphate, carbonate, chloride and fluoride of iron, cobalt, nickel, lanthanum, cerium and neodymium; organic salts, such as acetate, oxalate, and citrate; and oxides. More specifically, examples of the other metal compound include: cobalt nitrate, cobalt chloride, cobalt acetate; iron nitrate, iron sulfate, iron chloride, iron citrate, iron oxide; nickel nitrate, nickel chloride, nickel acetate, nickel oxide; lanthanum nitrate, lanthanum chloride, lanthanum acetate, lanthanum carbonate; cerium nitrate, cerium sulfate, cerium ammonium nitrate, cerium carbonate, cerium acetate; neodymium nitrate, neodymium chloride, neodymium acetate and neodymium carbonate.

With regard to the amount of the other metal to be carried in the refractory carrier, the other metal is preferably in the range of 1 to 20 grams in terms of its oxide, and more preferably in the range of 1 to 10 grams, based on 1 litter of the refractory carrier.

When the amount of the other metal is less than 1 gram, the $NO_x$ decomposition activity is lowered. Thus, such an amount is not preferred. On the other hand, when the amount of the other metal is more than 20 grams, an improvement of the $NO_x$ decomposition activity corresponding to the increase in the amount of the other metal is not exhibited any longer, resulting in an economical disadvantage. Moreover, when the amount of the other metal is more than 20 grams, the $SO_2$ oxidation activity is enhanced, and the amount of particulate matter in the exhaust is increased due to the generation of sulfates by the oxidation of $SO_2$. Thus, such an amount is not preferred.

Examples of the refractory inorganic oxide for dispersing the catalytic component include: active alumina, such as γ-alumina, δ-alumina, η-alumina and θ-alumina, α-alumina, titania, silica, zirconia, garia, zeolite; and composite oxides thereof, namely, for example, silica-alumina, alumina-titania, alumina-zirconia, and titania zirconia. It is possible to use one or a combination of these oxides. For the application of such an oxide to the exhaust from a diesel engine, a particularly preferred oxide among the above-mentioned oxides is zirconia which shows excellent durability against sulfur oxide, or a mixture of zirconia and zeolite.

Although the form of the refractory inorganic oxide is not particularly limited, a preferred form of the refractory inorganic oxide is powder. Moreover, the Brunauer-Emmett-Teller specific area (hereinafter referred to as the "BET specific area") of the refractory inorganic oxide is preferably within a range of from 5 to 400 $m^2/g$, and more preferably within a range of from 10 to 300 $m^2/g$. The average particle diameter of the refractory inorganic oxide is preferably within a range of from 0.1 to 150 μm, and more preferably within a range of from 0.2 to 100 μm.

It is preferred to use the refractory inorganic oxide in amounts ranging from 100 to 250 grams based on 1 litter of the refractory carrier. When less than 100 grams of the refractory inorganic oxide is used based on 1 litter of the refractory carrier, a sufficient catalytic ability is not obtained. Thus, the amount of the refractory carrier to be used based on 1 litter of the refractory carrier should be not less than 100 grams. Moreover, when more than 250 grams of the refractory inorganic oxide is used based on 1 litter of the refractory carrier, an improvement of the catalytic ability corresponding to the amount of the refractory inorganic oxide used is not exhibited. It is thus preferred not to use more than 250 grams of the refractory inorganic oxide based on 1 litter of the refractory carrier. As the refractory carrier for carrying the catalytic component, it is possible to use a pellet carrier and a monolith carrier. The use of the monolith carrier is more preferred. Examples of the monolith carrier include: open flow type ceramic honeycomb carrier, open flow type metal honeycomb carrier; wall flow type honeycomb monolith carrier; ceramic foam, metal foam; and metal mesh. Among these carriers, the use of the open flow type ceramic honeycomb carrier, or the open flow type metal honeycomb carrier is particularly suitable.

Preferred materials for the ceramic honeycomb carrier include cordierite, mullite, α-alumina, zirconia, titania, titanium phosphate, aluminum titanate, petalite, spodumene, aluminosilicate, and magnesium silicate. Among the honeycomb carriers formed by these materials, cordierite is particularly preferred. As the metal honeycomb carrier, the use of carriers made of antioxidant refractory metals, such as stainless steel, and Fe—Cr—Al alloy, is particularly suitable.

These monolith carries are produced by extrusion molding, tightly winding a sheet-like material, or other method. The (gas flow) cell of the monolith carrier is not particularly limited in its shape, and may be hexagon, quadrangle, triangle or corrugation. The cell density (the number of cells per unit cross sectional area) of the monolith carrier is within a range of 150 to 600 cells/square inch, and more preferably within a range of from 200 to 500 cells/square inch.

The method for producing the exhaust emission control catalysts of the present invention is not particularly limited. For example, it is possible to use method (1) in which after causing the refractory carrier to carry the refractory inorganic oxide, the refractory carrier is caused to further carry the catalytic component, or method (2) in which the refractory carrier is caused to carry a mixture of the refractory inorganic oxide and the catalytic component.

More specifically, in method (1), first, the refractory inorganic oxide in the form of a powder is water-ground to form a slurry. Subsequently, the refractory carrier is dipped in the resultant slurry. After removing excessive slurry, the refractory carrier is dried and calcined. As a result, the refractory carrier carrying the refractory inorganic oxide is obtained.

The drying temperature is preferably between 80 and 250° C., and more preferably between 100 and 150° C. The calcining temperature is preferably between 300 and 850° C., and more preferably between 400 and 700° C. The calcining time is preferably between 0.5 to 5 hours, and more preferably between 1 and 2 hours.

Next, in method (1), the refractory carrier carrying the refractory inorganic oxide is dipped in a solution containing a predetermined amount of the catalytic component. After removing excessive solution, the refractory carrier is dried and calcined. As a result, the catalytic component is carried on the refractory carrier in such a state that the catalytic component is contained in the refractory inorganic oxide carried on the refractory carrier. Thus, an exhaust emission control catalyst of the present invention is obtained.

The drying temperature is preferably between 80 and 250° C., and more preferably between 100 and 150° C. The calcining temperature is preferably between 300 and 850° C., and more preferably between 400 and 700° C. The calcining time is preferably between 0.5 to 5 hours, and more preferably between 1 and 2 hours.

On the other hand, in method (2), first, the refractory inorganic oxide is placed in a solution containing a predetermined amount of the catalytic component. After impregnating the refractory inorganic oxide with the catalytic component, the refractory inorganic oxide is dried and calcined. As a result, a mixture formed by the refractory inorganic oxide containing the catalytic component therein is obtained.

The drying temperature is preferably between 80 and 250° C., and more preferably between 100 and 150° C. The calcining temperature is preferably between 300 and 850° C., and more preferably between 400 and 700° C. The calcining time is preferably between 0.5 to 5 hours, and more preferably between 1 and 2 hours.

Next, in method (2), the mixture in the form of powder is water-ground to form slurry. Subsequently, the refractory carrier is dipped in the resultant slurry. After removing excessive slurry, the refractory carrier is dried and calcined. As a result, the mixture is carried on the refractory carrier, and an exhaust emission control catalyst of the present invention is obtained.

The drying temperature is preferably between 80 and 250° C., and more preferably between 100 and 150° C. The calcining temperature is preferably between 300 and 850° C., and more preferably between 400 and 700° C. The calcining time is preferably between 0.5 to 5 hours, and more preferably between 1 and 2 hours.

The exhaust emission control catalysts of the present invention can remove exhaust containing various amounts of hydrocarbons (the mole number in terms of methane)/$NO_x$ (mole number) ratios (hereinafter referred to as the $HC/NO_x$ ratio) by contact. More specifically, the exhaust emission control catalysts can satisfactorily remove injurious components of exhaust in which the $HC/NO_x$ ratio is between 0.5 and 30, and more satisfactorily remove injurious components of exhaust in which the $HC/NO_x$ ratio is between 1 and 20.

By removing injurious components of exhaust in which the $HC/NO_x$ ratio is in the above-mentioned range by bringing the exhaust into contact with the exhaust emission control catalyst, $NO_x$ in the exhaust can be sufficiently decomposed, and hydrocarbons in the exhaust can be substantially completely burned.

Moreover, the exhaust emission control catalyst of the present invention can satisfactorily remove the injurious components of exhaust from diesel engine, which contains excessive oxygen and discharges a particularly large amount of particulate matter in the exhaust in which the $HC/NO_x$ ratio is between 1 and 20. More specifically, with the removal of the exhaust from the diesel engine by bringing the exhaust into contact with the above-mentioned exhaust emission control catalyst, it is possible to sufficiently decompose $NO_x$ in the exhaust and substantially completely burn hydrocarbons in the exhaust. Moreover, it is possible to prevent the oxidation of sulfur oxides such as $SO_2$ in the exhaust from proceeding, thereby reducing the amount of the discharge of particulate matter caused by sulfate produced by the oxidation.

When the $HC/NO_x$ ratio is low, since the amount of hydrocarbons which function as a $NO_x$ reducing agent is small, there is a possibility of insufficient decomposition of $NO_x$ by the reduction of $NO_x$. In this case, it is necessary to introduce a reducing agent into the exhaust before bringing the exhaust into contact with the exhaust emission control catalyst so that the $HC/NO_x$ ratio at the time of the contact becomes an appropriate value.

The temperature at the time the reducing agent is introduced is preferably between 200 and 600° C., and more preferably between 300 and 500° C.

The reducing agent to be supplied to the exhaust is not particularly limited. For example, it is possible to use hydrogen, saturated hydrocarbon, unsaturated aliphatic hydrocarbon, aromatic hydrocarbon, alcohol, etc.

Examples of the saturated hydrocarbon include: alkanes having 1 to 20 carbons, such as methane, ethane, propane, butane, pentane, hexane, octane, nonane, and decane; and cycloalkane like cyclohexane. The alkanes may be straight chain or branched chain alkanes.

Examples of the unsaturated aliphatic hydrocarbon include alkenes having 1 to 20 carbons, such as methylene, ethylene, propylene, butene, buthadiene, pentene, pentadiene, hexene, hexadiene, heptene, heptadiene, heptatriene, octene, octadiene, and octatriene. The alkenes may be straight chain or branched chain alkenes. Examples of the unsaturated aromatic hydrocarbon include benzene, toluene, xylene, and trimethyl benzene.

Examples of the alcohol are alcohols having 1 to 20 carbons, such as methanol, ethanol, propanol, butanol, pentanol, hexanol, heptanol, octanol, nonanol, and decanol. The alcohols may be straight chain or branched chain alcohols.

As the reducing agent, it is preferred to use a compound which has a liquid phase or gaseous phase at room temperature because such a compound can be easily supplied to the exhaust. Moreover, the internal combustion engine is provided with a fuel tank containing fuel such as gas oil, natural gas, LPG (liquid propane gas), gasoline, and methanol. By supplying such fuel as the reducing agent to the exhaust, it is not necessary to newly provide a tank for storing the reducing agent, thereby producing an economical advantage. The method for supplying the reducing agent is not particularly limited. Suitable methods are, for example, supplying the reducing agent through a single pipe, and spraying the reducing agent with air.

BEST MODE FOR CARRYING OUT THE INVENTION

The following description will explain the present invention in detail by presenting examples and comparative examples. However, these examples are submitted for the purpose of illustration only and are not to be construed as limiting the scope of the invention in any way. The exhaust emission control ability of exhaust emission control catalysts were evaluated by carrying out the following test. In this test, a direct injection type diesel turbo engine (four cylinders, 2800 cc) was used as the internal combustion engine, and a gas oil containing 0.05 weight percent of sulfur was used as fuel of the internal combustion engine.

First, the exhaust emission control catalyst was installed in an exhaust pipe connected to the diesel engine, and the exhaust was caused to flow for 100 hours under such conditions that the full load engine speed was 2500 rpm and the temperature at an edge of the exhaust emission control catalyst on the upstream side (hereinafter referred to as the "catalyst inlet temperature") was 700° C.

Next, the torque of the diesel engine was set and the exhaust was caused to flow so that the engine speed was 2000 rpm and the catalyst inlet temperature as a test temperature was 350° C. The gas oil functioning as the $NO_x$ reducing agent was supplied to the exhaust pipe at a position on more upstream side than the installation position of the exhaust emission control catalyst so that the $HC/NO_x$ ratio in the exhaust became 5.

After the catalyst inlet temperature was sufficiently stabilized at 350° C., the concentrations (mol) of $NO_x$, hydrocarbon, carbon monoxide, and $SO_2$ in the exhaust before the addition of the gas oil were measured with continuous gas analyzers. More specifically, $NO_x$ was measured with a chemiluminescent detector (CLD). Hydrocarbon was measured with a flame ionization detector (FID). Carbon monoxide and $SO_2$ were respectively measured with a non-dispersive infrared analyzer (NDIR). As a result, it was found that the composition of the exhaust before the addition of gas oil was formed by 470 ppm $NO_x$, 160 ppm hydrocarbon, 200 ppm carbon monoxide, and 10 ppm $SO_2$.

A predetermined amount of the exhaust before the addition of gas oil was sampled, and diluted with air in a dilution tunnel. Thereafter, the sample was caused to pass through a commercially available particulate filter so as to trap particulate matter in the exhaust. After trapping the particulate matter, the weight of the particulate filter was measured, and the content of the particulate matter in the exhaust was calculated based on an increase in the weight of the particulate filter, the volume of the sampled exhaust, and the dilution ratio by air. The dilution ratio by air was obtained by measuring the concentration of carbon dioxide in the exhaust.

Moreover, after trapping the particulate matter, the particulate filter was extracted with dichloromethane. By measuring a decrease in the weight of the particulate filter, the content of SOF in the exhaust was calculated.

After bringing the exhaust into contact with the catalyst, the contents of $NO_x$, hydrocarbon, carbon monoxide, $SO_2$, particulate matter, and SOF (hereinafter referred to as the respective components) in the exhaust were measured.

The degree of the removal (conversion) of the respective components, i.e., removal of $NO_x$, removal of particulate matter, conversion of $SO_2$, removal of SOF, removal of hydrocarbon, and removal of carbon monoxide, were calculated based on the contents of the respective components before the addition of gas oil, and the contents thereof after the contact with the catalyst. The degree of removal (conversion) is given in percent by $$(X_0-X_1)/X_0 \times 100$$

where $X_0$ (mol) is the content before the addition of gas oil, and $X_1$ (mol) is the content after the contact with the catalyst.

Similarly, the contents of the respective components were measured at catalyst inlet temperatures of 450° C. and 550° C. as the test temperatures, and the degree of removal (conversion) of the respective components were calculated.

The composition of the exhaust before the addition of gas oil at a catalyst inlet temperature of 450° C. was formed by 470 ppm $NO_x$, 158 ppm hydrocarbon, 120 ppm carbon monoxide, and 12 ppm $SO_2$. On the other hand, the composition of the exhaust before the addition of gas oil at a catalyst inlet temperature of 550° C. was formed by 400 ppm $NO_x$, 93 ppm hydrocarbon, 80 ppm carbon monoxide, and 15 ppm $SO_2$.

EXAMPLE 1

3000 grams of zirconia powder with a BET specific area of 110 m²/g was placed as a refractory inorganic oxide into an aqueous solution containing 120 grams of copper nitrate, 258 grams of praseodymium nitrate, 337 grams of yttrium nitrate, and 410 grams of cobalt nitrate, and sufficiently mixed. After drying the mixture at 150° C. for 2 hours, the mixture was calcined at 500° C. for 1 hour. As a result, zirconia powder carrying a catalytic component in a dispersed state was obtained.

Next, the resultant zirconia powder was water-ground to form slurry. An open flow type honeycomb carrier made of cordierite was dipped as the refractory carrier in the resultant slurry. The honeycomb carrier had a cylindrical shape with a diameter of 5.66 inches and a length of 6.00 inches, and about 400 pieces of gas flow cells per square inch sectional area.

Subsequently, after removing excessive slurry, the honeycomb carrier dipped in the slurry was dried at 150° C. for 2 hours, and then calcined at 500° C. for 1 hour. As a result, an exhaust emission control catalyst was obtained.

In the resultant catalyst, 2 grams of copper oxide (CuO), 5 grams of praseodymium oxide ($Pr_6O_{11}$), 5 grams of yttrium oxide ($Y_2O_3$), 5 grams of cobalt oxide (CoO), and 150 grams of zirconia were carried per liter of carrier.

The amounts of these oxides carried are shown in Table 1.

TABLE 1

| | Amounts (g) of metallic oxides carried per liter of refractory carrier | | | | | |
|---|---|---|---|---|---|---|
| | Cu | Pr | Y | Co | Fe | Zr | zeolite |
| Example 1 | 2 | 5 | 5 | 5 | — | 150 | — |
| Example 2 | 2 | 5 | 5 | — | 5 | 150 | — |
| Example 3 | 2 | 5 | 5 | — | — | 150 | — |
| Example 4 | 5 | 5 | 5 | — | — | 150 | — |
| Example 5 | 2 | 5 | 10 | — | — | 150 | — |
| Example 6 | 2 | 5 | 5 | — | — | 100 | 50 |
| Comparative Example 1 | — | 5 | 5 | — | — | 150 | — |
| Comparative Example 2 | 2 | — | 5 | — | — | 150 | — |
| Comparative Example 3 | 2 | 5 | — | — | — | 150 | — |
| Comparative Example 4 | 30 | 5 | 5 | — | — | 150 | — |

Each bar shown in Table 1 indicates that the oxide indicated in the top of the corresponding column was not added.

In this case, the praseodymium oxide contained in the exhaust emission control catalyst was 2.5 weight parts based on 1 weight part of the copper oxide. The yttrium oxide contained in the exhaust emission control catalyst was 2.5 weight parts based on 1 weight part of the copper oxide.

The exhaust emission control ability of the resultant exhaust emission control catalyst was evaluated according to the above-mentioned test. Namely, the degree of removal (conversion) of the respective components was measured at catalyst inlet temperatures of 350° C., 450° C., and 550° C. The results are shown in Tables 2 and 3.

TABLE 2

| | Removal of $NO_x$ (%) | | | Removal of particulate matter (%) | | | Conversion of $SO_2$ (%) | | |
|---|---|---|---|---|---|---|---|---|---|
| | A | B | C | A | B | C | A | B | C |
| Example 1 | 18 | 42 | 36 | 20 | 23 | 14 | 0 | 2 | 9 |
| Example 2 | 18 | 36 | 24 | 16 | 19 | 16 | 0 | 3 | 9 |
| Example 3 | 12 | 40 | 45 | 16 | 27 | 13 | 0 | 0 | 5 |
| Example 4 | 42 | 44 | 30 | 22 | 16 | 5 | 1 | 4 | 15 |
| Example 5 | 22 | 43 | 40 | 21 | 26 | 14 | 0 | 1 | 10 |
| Example 6 | 12 | 45 | 50 | 18 | 26 | 18 | 0 | 1 | 8 |
| Comparative Example 1 | 6 | 9 | 10 | 8 | 18 | 20 | 0 | 0 | 0 |
| Comparative Example 2 | 26 | 42 | 43 | 18 | 12 | −5 | 1 | 10 | 40 |
| Comparative Example 3 | 8 | 25 | 13 | 12 | 26 | 16 | 0 | 2 | 18 |
| Comparative Example 4 | 48 | 36 | 14 | 16 | 5 | −30 | 10 | 27 | 64 |

A = 350° C., B = 450° C., C = 550° C.

EXAMPLE 2

An exhaust emission control catalyst was prepared in the same manner as in Example 1 except that 407 grams of iron nitrate was used instead of 410 grams of cobalt nitrate of Example 1.

In the resultant catalyst, 2 grams of copper oxide, 5 grams of praseodymium oxide, 5 grams of yttrium oxide, 5 grams of iron oxide ($Fe_2O_3$), and 150 grams of zirconia were carried per liter of carrier. The amounts of these oxides carried are shown in Table 1.

In this case, the praseodymium oxide contained in the exhaust emission control catalyst was 2.5 weight parts based on 1 weight part of the copper oxide. The yttrium oxide contained in the exhaust emission control catalyst was 2.5 weight parts based on 1 weight part of the copper oxide.

The degree of removal (conversion) of the respective components was measured at the above-mentioned test temperatures. The results are shown in Tables 2 and 3.

TABLE 3

| | Removal of SOF (%) | | | Removal of hydrocarbon (%) | | | Removal of carbon monoxide (%) | | |
|---|---|---|---|---|---|---|---|---|---|
| | A | B | C | A | B | C | A | B | C |
| Example 1 | 49 | 77 | 86 | 45 | 84 | 98 | 12 | 66 | 81 |
| Example 2 | 41 | 73 | 85 | 36 | 76 | 95 | −15 | 51 | 77 |
| Example 3 | 40 | 72 | 83 | 31 | 80 | 93 | −10 | 61 | 71 |
| Example 4 | 61 | 80 | 85 | 60 | 90 | 97 | 30 | 72 | 78 |
| Example 5 | 52 | 75 | 82 | 48 | 78 | 89 | 15 | 54 | 75 |
| Example 6 | 46 | 75 | 84 | 44 | 80 | 91 | 10 | 61 | 76 |
| Comparative Example 1 | 20 | 45 | 50 | 18 | 44 | 46 | 0 | −15 | −20 |
| Comparative Example 2 | 51 | 81 | 88 | 49 | 88 | 97 | 10 | 70 | 80 |
| Comparative Example 3 | 31 | 75 | 86 | 25 | 83 | 94 | −5 | 60 | 76 |
| Comparative Example 4 | 65 | 81 | 86 | 63 | 88 | 94 | 45 | 70 | 77 |

A = 350° C., B = 450° C., C = 550° C.

EXAMPLE 3

An exhaust emission control catalyst was prepared in the same manner as in Example 1 except that cobalt nitrate described in Example 1 was omitted.

In the resultant catalyst, 2 grams of copper oxide, 5 grams of praseodymium oxide, 5 grams of yttrium oxide, and 150 grams of zirconia were carried per liter of carrier. The amounts of these oxides carried are shown in Table 1.

In this case, the praseodymium oxide contained in the exhaust emission control catalyst was 2.5 weight parts based on 1 weight part of the copper oxide. The yttrium oxide contained in the exhaust emission control catalyst was 2.5 weight parts based on 1 weight part of the copper oxide.

The degree of the removal (conversion) of the respective components was measured at the above-mentioned test temperatures. The results are shown in Tables 2 and 3.

EXAMPLE 4

An exhaust emission control catalyst was prepared in the same manner as in Example 1 except that the amount of copper nitrate described in Example 1 was changed from 120 grams to 300 grams and cobalt nitrate in Example 1 was omitted.

In the resultant catalyst, 5 grams of copper oxide, 5 grams of praseodymium oxide, 5 grams of yttrium oxide, and 150 grams of zirconia were carried per litter of carrier. The amounts of these oxides carried are shown in Table 1.

In this case, the praseodymium oxide contained in the exhaust emission control catalyst was 1 weight part based on 1 weight part of the copper oxide. The yttrium oxide contained in the exhaust emission control catalyst was 1 weight part based on 1 weight part of the copper oxide.

The degree of the removal (conversion) of the respective components was measured at the above-mentioned test temperatures. The results are shown in Tables 2 and 3.

EXAMPLE 5

An exhaust emission control catalyst was prepared in the same manner as in Example 1 except that the amount of yttrium nitrate described in Example 1 was changed from 337 grams to 674 grams, and cobalt nitrate was omitted.

In the resultant catalyst, 2 grams of copper oxide, 5 grams of praseodymium oxide, 10 grams of yttrium oxide, and 150 grams of zirconia were carried per litter of carrier. The amounts of these oxides carried are shown in Table 1.

In this case, the praseodymium oxide contained in the exhaust emission control catalyst was 2.5 weight parts based on 1 weight part of the copper oxide. The yttrium oxide contained in the exhaust emission control catalyst was 5 weight parts based on 1 weight part of the copper oxide.

The degree of removal (conversion) of the respective components was measured at the above-mentioned test temperatures. The results are shown in Tables 2 and 3.

EXAMPLE 6

An exhaust emission control catalyst was prepared in the same manner as in Example 1 except that a mixture of 2000 grams of zirconia powder with a BET specific area of 110 $m^2/g$ and 1000 grams of commercially available ZSM-5 zeolite with a BET specific area of 430 $m^2/g$ was used as the refractory inorganic oxide instead of 3000 grams of zirconia powder with a BET specific area of 110 $m^2/g$ described in Example 1, and cobalt nitrate was omitted.

In the resultant catalyst, 2 grams of copper oxide, 5 grams of praseodymium oxide, 5 grams of yttrium oxide, 100 grams of zirconia, and 50 grams of zeolite were carried per litter of carrier. The amounts of these oxides carried are shown in Table 1.

In this case, the praseodymium oxide contained in the exhaust emission control catalyst was 2.5 weight parts based on 1 weight part of the copper oxide. The yttrium oxide contained in the exhaust emission control catalyst was 2.5 weight parts based on 1 weight part of the copper oxide.

The degree of removal (conversion) of the respective components was measured at the above-mentioned test temperatures. The results are shown in Tables 2 and 3.

COMPARATIVE EXAMPLE 1

An exhaust emission control catalyst was prepared in the same manner as in Example 1 except that copper nitrate and cobalt nitrate described in Example 1 were omitted.

In the resultant catalyst, 5 grams of praseodymium oxide, 5 grams of yttrium oxide, and 150 grams of zirconia were carried per litter of carrier. The amounts of these oxides carried are shown in Table 1.

The degree of removal (conversion) of the respective components was measured at the above-mentioned test temperatures. The results are shown in Tables 2 and 3.

COMPARATIVE EXAMPLE 2

An exhaust emission control catalyst was prepared in the same manner as in Example 1 except that praseodymium nitrate and cobalt nitrate described in Example 1 were omitted.

In the resultant catalyst, 2 grams of copper oxide, 5 grams of yttrium oxide, and 150 grams of zirconia were carried per litter of carrier. The amounts of these oxides carried are shown in Table 1.

In this case, the yttrium oxide contained in the exhaust emission control catalyst was 2.5 weight parts based on 1 weight part of the copper oxide.

The degree of removal (conversion) of the respective components was measured at the above-mentioned test temperatures. The results are shown in Tables 2 and 3.

COMPARATIVE EXAMPLE 3

An exhaust emission control catalyst was prepared in the same manner as in Example 1 except that yttrium nitrate and cobalt nitrate described in Example 1 were omitted.

In the resultant catalyst, 2 grams of copper oxide, 5 grams of praseodymium oxide, and 150 grams of zirconia were carried per litter of carrier. The amounts of these oxides carried are shown in Table 1.

In this case, the praseodymium oxide contained in the exhaust emission control catalyst was 2.5 weight parts based on 1 weight part of the copper oxide.

The degree of removal (conversion) of the respective components was measured at the above-mentioned test temperatures. The results are shown in Tables 2 and 3.

COMPARATIVE EXAMPLE 4

An exhaust emission control catalyst was prepared in the same manner as in Example 1 except that the amount of copper nitrate described in Example 1 was changed from 120 grams to 1800 grams, and cobalt nitrate was omitted.

In the resultant catalyst, 30 grams of copper oxide, 5 grams of praseodymium oxide, 5 grams of yttrium oxide, and 150 grams of zirconia were carried per litter of carrier. The amounts of these oxides carried are shown in Table 1.

In this case, the praseodymium oxide contained in the exhaust emission control catalyst was 0.133 weight parts based on 1 weight part of the copper oxide. The yttrium oxide contained in the exhaust emission control catalyst was 0.133 weight parts based on 1 weight part of the copper oxide.

The degree of removal (conversion) of the respective components was measured at the above-mentioned test temperatures. The results are shown in Tables 2 and 3.

It is clear from Tables 2 and 3 showing the results of Examples 1 to 6 and Comparative Examples 1 to 4 that the exhaust emission control catalysts of the examples are excellent in the exhaust emission control ability, particularly in the removal of $NO_x$, and in the removal particulate matter under high temperature conditions.

Additionally, compared to the exhaust emission control catalysts of Comparative Examples 2 and 4, the exhaust emission control catalysts of the examples suppress the conversion of $SO_2$ to a great degree, thereby significantly improving the degree of removal of particulate matter.

INDUSTRIAL APPLICABILITY

Since the exhaust emission control catalysts of the present invention can efficiently remove $NO_x$ in exhaust containing a large amount of oxygen and reduce the amount of particulate matter in the exhaust particularly under high temperature conditions, the exhaust emission control catalysts are suitable for use in an internal combustion engine like a diesel engine.

Moreover, a method for controlling the emission of exhaust of the present invention can efficiently remove $NO_x$ in exhaust in which the mole ratio of hydrocarbon to $NO_x$ is between 0.5 and 30, and more preferably 1 and 20, and particularly reduce the discharge of particulate matter in the exhaust under high temperature conditions. Thus, this method is suitably used for controlling the emission of exhaust from an internal combustion engine like a diesel engine.

What is claimed is:

1. A method for controlling emission of exhaust comprising bringing exhaust containing hydrocarbon and nitrogen oxide in a mole ratio (hydrocarbon/nitrogen oxide) within a range of 0.5 to 30 into contact with an exhaust emission control catalyst, wherein:

said exhaust emission control catalyst includes a catalytic component containing copper, praseodymium, and yttrium, and a refractory carrier for carrying the catalytic component, and a weight ratio of the copper, praseodymium and yttrium in terms of oxides thereof is arranged so that praseodymium oxide is between 0.2 to 20 weight parts, and yttrium oxide is between 0.2 to 20 weight parts based on 1 weight part of copper oxide.

2. The method for controlling emission of exhaust as set forth in claim 1, wherein said ratio is within a range of 1 to 20.

3. The method for controlling emission of exhaust as set forth in claim 1, wherein the catalytic component further contains other metal consisting of at least one kind of element selected from the group consisting of cobalt, iron, nickel, lanthanum, cerium, and neodymium.

4. The method for controlling emission of exhaust as set forth in claim 1, wherein the exhaust is emitted from a diesel engine.

5. The method for controlling emission of exhaust as set forth in claim 1, wherein an amount of copper in terms of oxide thereof is within a range of from 1 to 20 grams based on 1 liter of the refractory carrier.

6. The method for controlling emission of exhaust as set forth in claim 1, wherein an amount of praseodymium in terms of oxide thereof is within a range of from 1 to 20 grams based on 1 liter of the refractory carrier.

7. The method for controlling emission of exhaust as set forth in claim 1, wherein an amount of yttrium in terms of oxide thereof is within a range of from 1 to 20 grams based on 1 liter of the refractory carrier.

8. The method for controlling emission of exhaust as set forth in claim 1, wherein the catalyst further comprises at least one other metal selected from the group consisting of cobalt, iron, nickel, lanthanum, cerium, and neodymium.

9. The method for controlling emission of exhaust as set forth in claim 8, wherein said at least one other metal is in an amount in terms of oxide thereof within a range of from 1 to 20 grams based on 1 liter of the refractory carrier.

10. The method for controlling emission of exhaust as set forth in claim 1, wherein the refractory carrier is at least one of zirconia and zeolite.

11. The method for controlling emission of exhaust as set forth in claim 1, wherein the refractory carrier is open flow type honeycomb carrier.

12. The method for controlling emission of exhaust as set forth in claim 1, wherein the refractory carrier is a pellet carrier or a monolith carrier.

13. The method for controlling emission of exhaust as set forth in claim 12, wherein the monolith carrier is selected from the group consisting of open flow ceramic honeycomb carrier, open flow metal honeycomb carrier, wall flow honeycomb monolith carrier, ceramic foam, metal foam, and metal mesh.

14. The method for controlling emission of exhaust as set forth in claim 1, wherein the carrier is selected from the group consisting of cordierite, mullite, α-alumina, zirconia, titania, titanium phosphate, aluminum titanate, pelalite, spodumene, aluminosilicate, and magnesium silicate.

15. The method for controlling emission of exhaust as set forth in claim 1, wherein the refractory carrier is an antioxidant refractory metal.

16. The method for controlling emission of exhaust as set forth in claim 15, wherein the antioxidant refractory metal is stainless steel or Fe—Cr—Al alloy.

* * * * *